(12) United States Patent
DeTreville

(10) Patent No.: US 7,757,075 B2
(45) Date of Patent: Jul. 13, 2010

(54) STATE REFERENCE

(75) Inventor: John DeTreville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 876 days.

(21) Appl. No.: 10/295,109

(22) Filed: Nov. 15, 2002

(65) Prior Publication Data

US 2004/0098580 A1 May 20, 2004

(51) Int. Cl.
*H04L 29/00* (2006.01)
*H04L 29/06* (2006.01)

(52) U.S. Cl. .................. 713/155; 713/150; 713/156; 713/177; 726/26; 726/27; 726/28; 726/29; 726/30; 709/225; 709/226; 709/229

(58) Field of Classification Search ............... 726/26–31
See application file for complete search history.

(56) References Cited

U.S. PATENT DOCUMENTS

| | | | |
|---|---|---|---|
| 5,530,235 A | 6/1996 | Stefik et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 6,047,242 A * | 4/2000 | Benson | 702/35 |
| 6,766,305 B1 * | 7/2004 | Fucarile et al. | 705/51 |
| 7,213,269 B2 * | 5/2007 | Orthlieb et al. | 726/33 |
| 7,278,168 B1 * | 10/2007 | Chaudhury et al. | 726/30 |
| 7,281,273 B2 * | 10/2007 | Strom et al. | 726/27 |
| 7,380,120 B1 * | 5/2008 | Garcia | 713/160 |
| 7,464,058 B2 * | 12/2008 | Yen et al. | 705/59 |
| 7,613,915 B2 * | 11/2009 | Srinivasan et al. | 713/1 |
| 7,624,276 B2 * | 11/2009 | Princen et al. | 713/177 |
| 2003/0028488 A1 * | 2/2003 | Mohammed et al. | 705/59 |

OTHER PUBLICATIONS

Iannella, Renato. "Open Digital Rights Language (ORDL)" (Aug. 2002). The ODRL Initiative; www.ordl.net.*
Bonczek, et al., "A Transformational Grammar-Based Query Processor for Access Control in a Planning System", ACM Transactions on Database Systems, vol. 2, No. 4, Dec. 1977, pp. 326-338.

* cited by examiner

*Primary Examiner*—Syed A. Zia
(74) *Attorney, Agent, or Firm*—Workman Nydegger

(57) ABSTRACT

A computer-implemented mechanism for granting rights to a resource is described. A license identifies-one or more principals, resources, rights and conditions. At least one condition recited in the license includes a reference to state information. The state information is external to the license. When evaluating the license, a resource or access control module requests the state information from the entity identified in the reference to state information.

15 Claims, 6 Drawing Sheets

STATE REFERENCE

STATE REFERENCE

1. Field of the Invention

The invention generally relates to the field of computer security and, more particularly, to digital licenses and related systems and methods that include references to state information that is external to the licenses.

2. Background

Authorization policy languages and data structures are frequently used to grant users rights to access digital data. Conventional authorization policy languages and data structures utilize licenses. A license typically identifies the issuer, the user or principal, the right, the resource and any conditions. FIG. 1 illustrates a conventional mechanism for granting rights to access a resource 102. Resource 102 may be a digital work in the form of an image, an audio or video file, an e-book, or the like. When a trusted issuer 104 desires to grant a user 106 access to resource 102, trusted issuer 102 issues a license 108 to user 106.

License 108 includes a condition field 108a that limits the exercise of the license to four times. When utilized, user 106 transmits license 108 to resource 102. Resource 102 examines the license and then modifies condition field 108a or creates a new license 110 to show that the license is only valid three more times. The updated or new license containing the updated state information is then transmitted to user 106. Alternatively, user 106 transmits license 108 to an intermediate access control module that mediates access to resource 102.

There are several drawbacks to the mechanism of granting rights in the manner shown in FIG. 1. For example, a license that has been rewritten or altered will not be correctly signed by the trusted issuer and so must be specially treated. Moreover, user 106 must be kept from retaining a usable copy of the original license 108 and using it more than four times, perhaps at different locations on a network. Finally, modifying or reissuing licenses can be a prohibitive burden on resources and limits flexibility.

Therefore, there is a need in the art for an authorization policy language and data structure that allows licenses to describe state information without requiring that the license be rewritten or modified as the state information is changed or updated and without placing related constraints on the use of licenses.

SUMMARY

One or more of the above-mentioned needs in the art are satisfied by the disclosed authorization languages and data structures. Computer-implemented mechanisms for granting rights to a resource are described. A trusted issuer provides a license to a principal. The license identifies one or more principals, resources, rights and conditions. At least one reference to state information is included in at least one field of the license. The actual state information is external to the license. When evaluating the license, a resource or access control module requests the state information from the entity identified in the reference to state information. Storing the state information at a location other than the license limits the need to reissue licenses after each use and provides flexibility to trusted issuers and users of the licenses.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Aspects of the present invention are suitable for use in a distributed computing system environment. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

The invention will be described in the general context of computer-executable instructions, such as program modules, that are executed by a processing device, including, but not limited to a personal computer. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
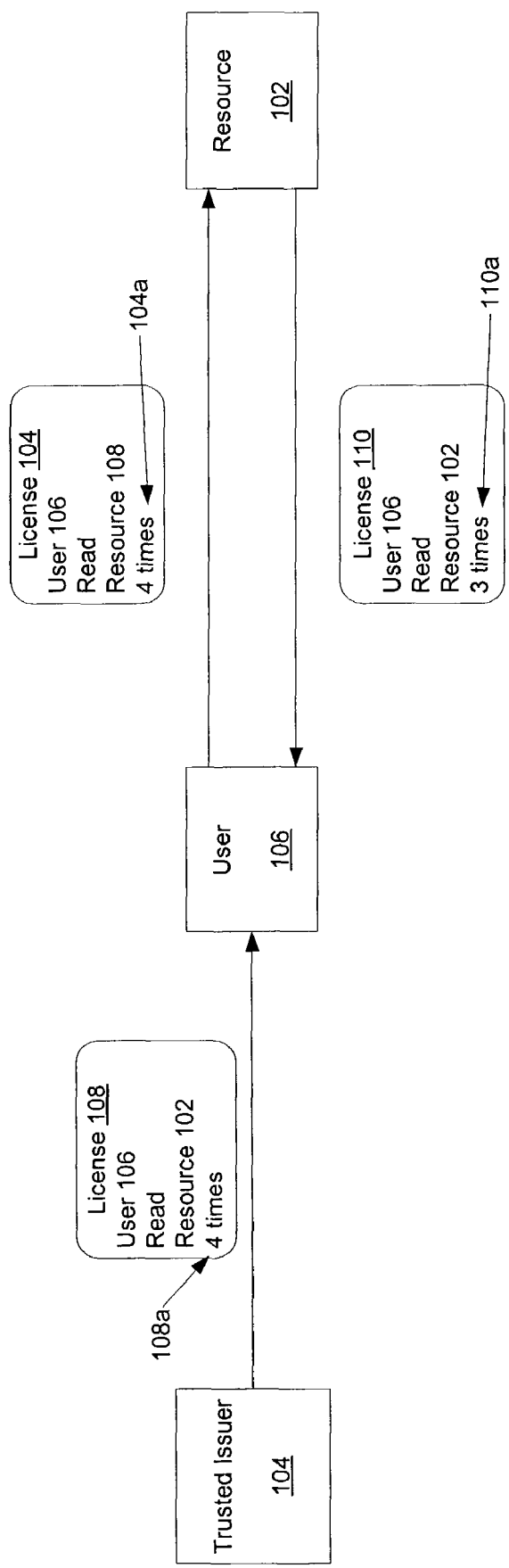
FIG. 1 illustrates a prior art mechanism for granting rights to access a resource.
Figure 2:
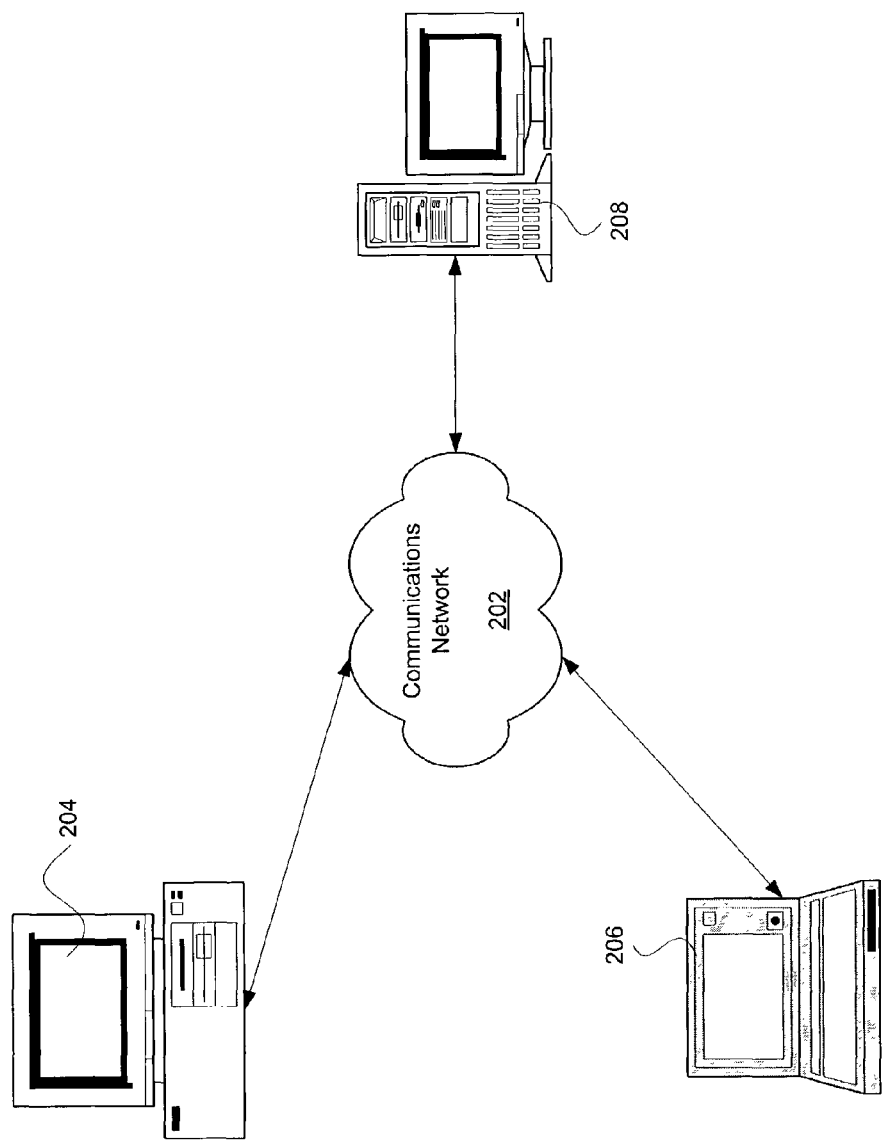
FIG. 2 shows an illustrative distributed computing system operating environment that may be used to implement aspects of the invention.

FIG. 2 illustrates an example of a suitable distributed computing system 200 operating environment in which the invention may be implemented. Distributed computing system 200 is only one example of a suitable operating environment and is not intended to suggest any limitation as to the scope of use or functionality of the invention. System 200 is shown as including a communications network 202. The specific network implementation used can be, for example, any type of local area network (LAN) and associated LAN topologies and protocols; simple point-to-point networks (such as direct modem-to-modem connection); and wide area network (WAN) implementations, including public Internets and commercial based network services such as the Microsoft Network or America Online's network. Systems may also include more than one communication network, such as a LAN coupled to the Internet.

Computer device 204, computer device 206 and computer device 208 may be coupled to communications network 202 through communication devices. Network interfaces or adapters may be used to connect computer devices 204, 206 and 208 to a LAN. When communications network 202 includes a WAN, modems or other means for establishing communications over WANs may be utilized. Computer devices 204, 206 and 208 may communicate with one another via communication network 202 in ways that are well known in the art. The existence of any of various well-known protocols, such as TCP/IP, Ethernet, FTP, HTTP and the like, is presumed. Computer devices 204, 206 and 208 may exchange content, applications, messages and other objects via communications network 202.

Description of Illustrative Embodiments

Figure 3:
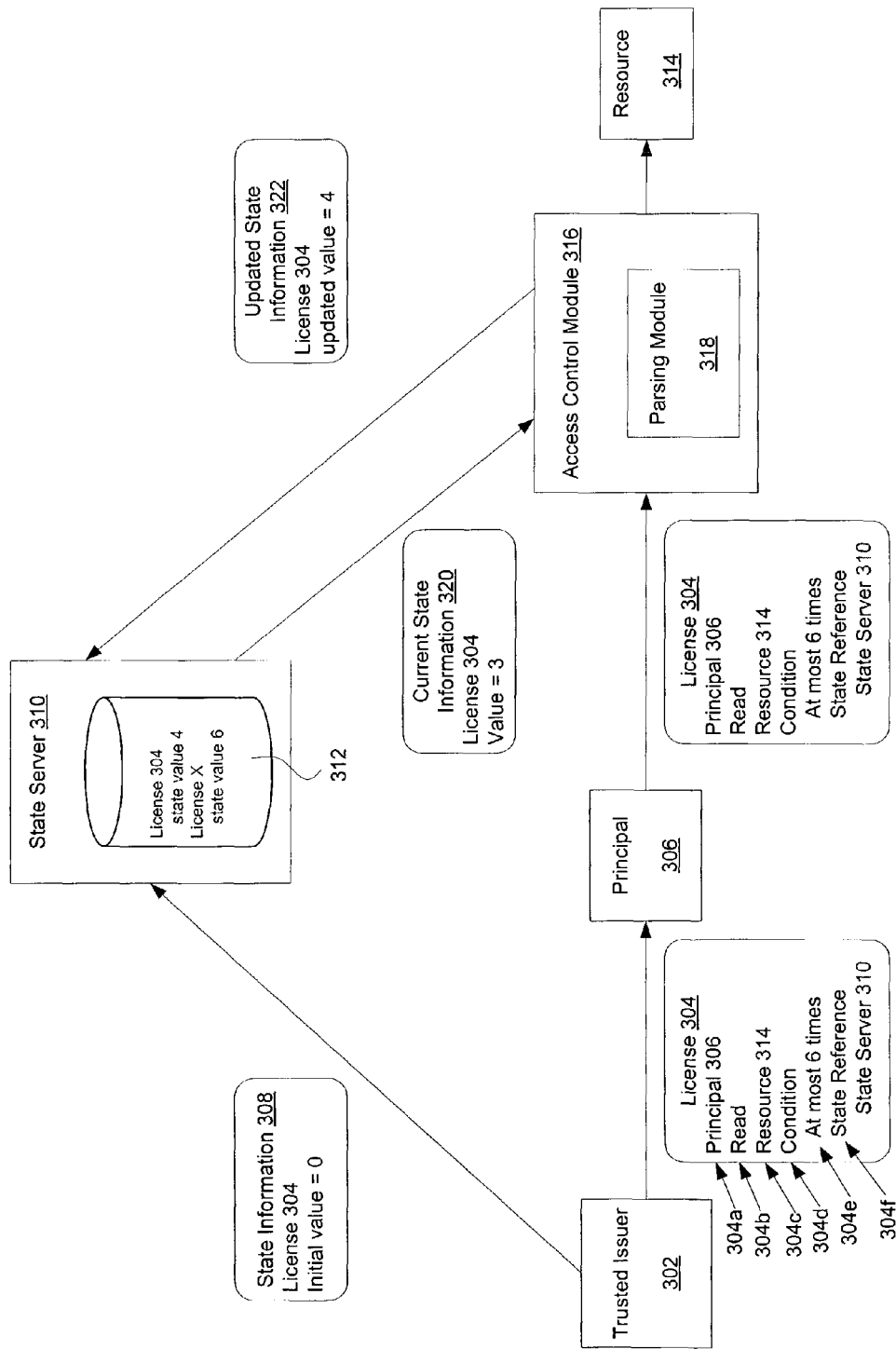
FIG. 3 illustrates a mechanism for granting a principal rights to a resource with the use of state information stored remotely to a license, in accordance with an embodiment of the invention.

FIG. 3 illustrates a mechanism for granting rights to resources in accordance with an embodiment of the invention. A trusted issuer 302 transmits a license 304 to a principal 306. License 304 may be formatted in accordance with a derivative of XML or created with an object oriented programming language. License 304 includes: a field 304a identifying the principal, a field 304b identifying the right, a field 304c identifying the resource and a field 304d identifying one or more conditions. In the embodiment shown, license 304 includes a condition in the form of an exercise limit in field 304e. In particular, license 304 can be used at most six times.

Condition field 304d also includes a reference to state information. In particular, field 304f identifies a state server 310. In one embodiment of the invention, the reference to state information is in the form of a universal resource locator (URL). In other embodiments of the invention, the reference to state information contains a universal resource name (URN), such as a UDDI name.

In addition to transmitting license 304 to principal 306, trusted issuer 302 may also transmit initial state information 308 to a state server 310. State information 308 may identify license 304 and include an initial value. One skilled in the art will appreciate that there are numerous ways to initialize state information that is stored at a location external to the license. For example, state server 310 may automatically initialize a value to zero whenever the server receives new state information 308. In another embodiment of the invention, principal 306 may transmit state information to state server 310 to initialize state information. State server 310 may include a database 312 or other memory mechanism that stores current state values for corresponding licenses. In the embodiment shown in FIG. 3, an implicit identifier corresponding to the license in question is used as the key to retrieve and later to set the state value held at state server 310. In another embodiment of this invention, the state reference in license 304 may also contain an explicit key to be used to retrieve and set the state value held at state server 310.

When principal 306 desires to exercise the right included in license 304, principal 306 transmits license 304 to an access control module 316. Access control module 316 may be a software or hardware module, residing locally or remotely to corresponding resource 314 and mediates access to resource 314. Access control module 316 may include a parsing module 318 to parse and interpret licenses. In one particular embodiment that uses licenses formatted in accordance with XrML schemas, parsing module 318 parses an XrML document to obtain license data. In alternative embodiments of the invention, one or more resources may include access control modules and/or parsing modules that perform the functions of access control module 316 and parsing module 318.

When analyzing license 304, access control module 316 may request current state information from state server 310. In response to this request, state server 310 may transmit current state information 320 to access control module 316. Access control module 316 may then use state information to evaluate whether one or more conditions included in license 304 have been satisfied. In some embodiments of the invention, state information is included within at least one Boolean expression. In another embodiment of the invention, more than one principal may possess separate licenses including references to the same state information. For example, license 304 allows principal 306 to read resource 314 six times. Another principal (not shown) may include a similar license containing a reference to the same state information. In that embodiment of the invention, the maximum number of times that resource 314 may be read by both principals together is equal to six times. There are numerous alternative permutations that may involve several principals utilizing references to the same state information.

After evaluating license 304 and granting access to resource 314, access control module 316 may then transmit updated state information 322 to state server 310. Updated state information 322 may identify the license and an updated state value. Of course, there are numerous alternative methods for updating state information that are well within the skill of the art. For example, state server 310 may be configured to automatically increment or decrement a state value by one each time a state value is requested. In another alternative embodiment, resource 314 may provide updated state information to state server 310.

Figure 4:
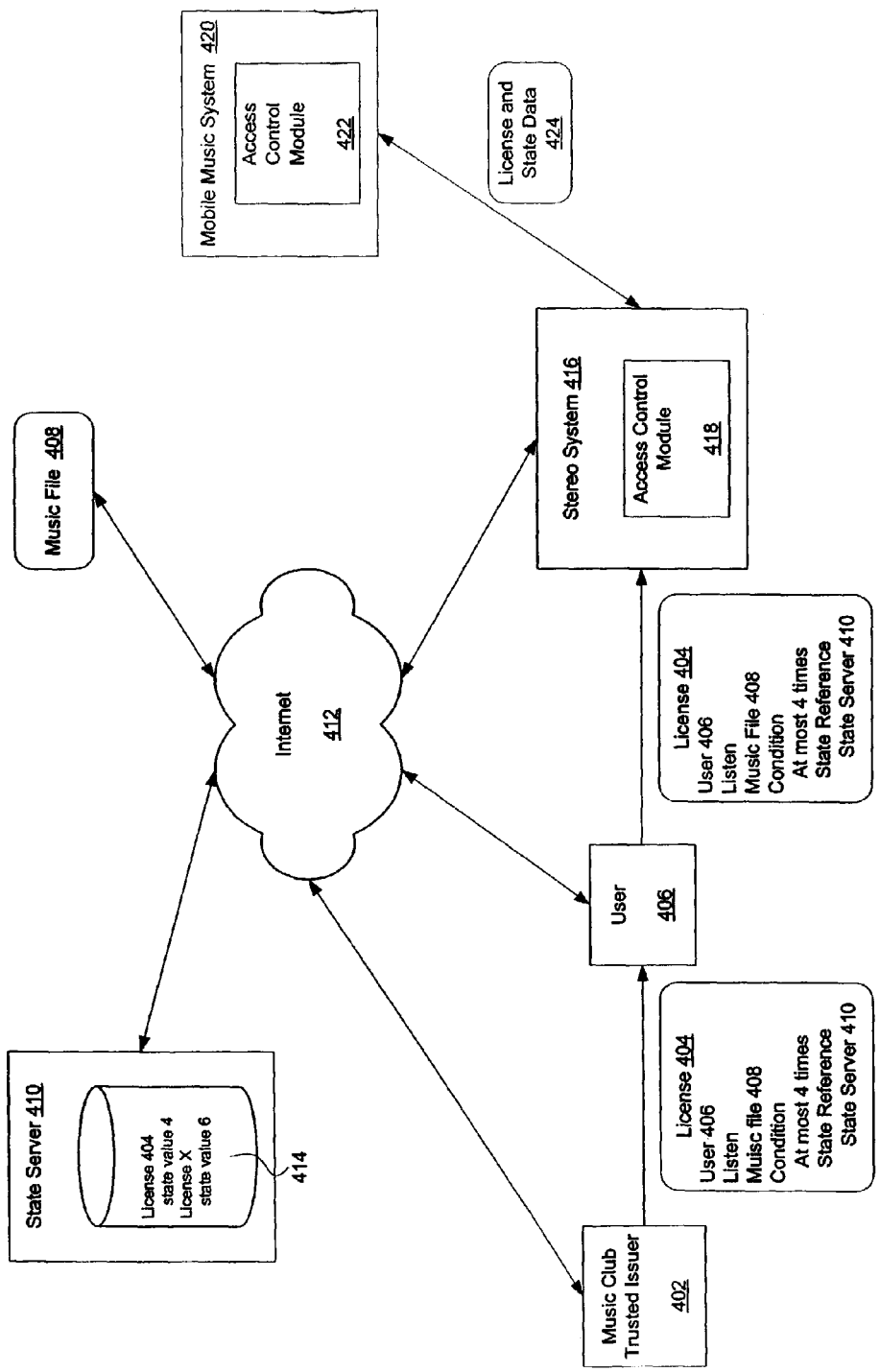
FIG. 4 illustrates a mechanism for granting rights to a resource wherein state information may be transferred from one device to another, in accordance with an embodiment of the invention.

FIG. 4 illustrates embodiment of the invention in which state information may be transferred from one location to another location. Allowing for the transfer state information provides increased flexibility to trusted issuers and license holders. The non-limiting implementation shown in FIG. 4 involves a music club and music files. One skilled in the art will appreciate that the present invention is not limited to such an implementation and that aspects of the invention may be used with numerous other implementations that involve the transfer of state information from one location to another.

A music club trusted issuer 402 transmits a license 404 to a music club user 406. License 404 includes a condition that the user 406 may listen to a certain music file 408 at most four times. License 404 also includes a reference to state information held at a state server 410. State server 410 may be coupled to music club trusted issuer 402 and/or user 406 via a wide area network, such as the Internet 412. Similar to state server 310 (shown in FIG. 3), state server 410 may include a database 414 that stores current state information corresponding to one or more licenses. When user 406 desires to listen to music file 408, user 406 may transmit license 404 to a stereo system 416. Stereo system 416 may include an access control module 418. Access control module 418 may function similarly to access control module 316 (shown in FIG. 3).

Before downloading and playing music file 408, stereo system 416 may evaluate license 404. In particular, stereo system 416 may determine whether or not the currents state information stored in state server 410 will allow the access. FIG. 4 shows embodiment which music file 408 is stored remotely from stereo system 416. In alternative embodiments of the invention, music file 408 may be stored locally. User 406 may wish to transfer music file 408 to a mobile music system 420. Mobile music system 420 may be in the form of an MP3 player and may include an access control module 422. Mobile music system 420 may be intended to play music files while it is not attached to any network.

In order to control the distribution and use of music file 408 and to allow its use on mobile music system 420 while that system is not attached to any network, stereo system 416 and mobile music system 420 may be configured so that copies of the appropriate licenses and their referenced state information are also transferred between the components whenever music file 408 is transferred. In one embodiment of this invention, when music file 408 and state information are transferred to mobile music system 420, an appropriate synchronization mechanism may be used to prevent stereo system 416 from playing music file 408 until the state information is returned to stereo system 416. User 406 may listen to music file 408 with mobile music system 420 even though mobile music system 420 is not attached to any network and therefore is not coupled to state server 410. The relevant state information and license 404 may be cached locally within mobile music system 420 and access control module 422 may be used to ensure that the terms of license 404 are not exceeded.

When mobile music system 420 is reconnected with stereo system 416, updated state information may be retrieved from mobile music system 420 and stored in stereo system 416. Then, the updated state information may be transmitted to state server 410. In one embodiment of this invention, mobile music system 420 may be configured to delete any copy of music file 408 whenever state information is transferred from mobile music system 420 to any other entity.

Figure 5:
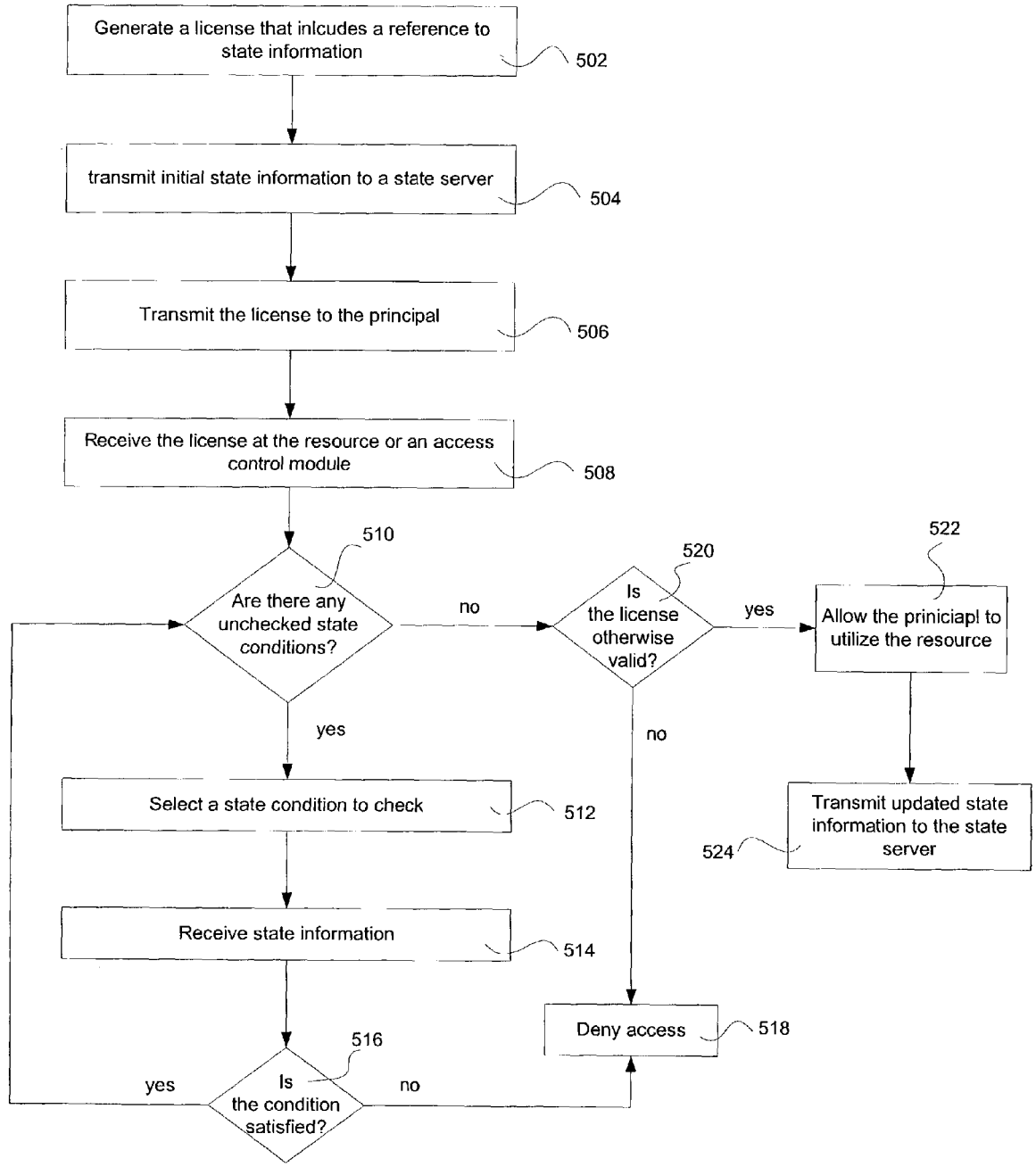
FIG. 5 illustrates a method of generating and processing a license that includes at least one reference to state information, in accordance with an embodiment of the invention.

FIG. 5 illustrates a method of distributing and processing licenses in accordance with an embodiment of the invention. First, in step 502 the trusted issuer generates a license that includes a reference to state information. As discussed above, the reference may be included in a condition field of the license. The trusted issuer may also transmit the initial state information to a state server. In addition to transmitting initial state information, the trusted issuer may also transmit the identification of principals and/or licenses that have access to the state information. The license is then transmitted to the principal in step 506. Of course, it is not necessary that the license be transmitted to the principal after the initial state information is transmitted to a state server or other entity. One skilled in the art will appreciate that several steps shown in FIG. 5 may be in alternative orders.

In step 508, the license is received at the resource or an access control module. Next, in step 510 it is determined whether the license contains any unchecked state conditions. If there is at least one unchecked state condition, in step 512, a state condition is selected to be checked. The selected state condition may correspond to the first unchecked state condition in the license. The resource or access control module receives the relevant state information from the appropriate state server in step 514.

In step 516, it is determined whether or not the unchecked state condition is satisfied. Step 516 may include inserting the received state information into a Boolean expression and evaluating the expression. When the condition is satisfied, control returns to step 510 where it is determined whether or not there are any further unchecked state conditions. When the condition is not satisfied, in step 518 access is denied.

When there are no longer any unchecked state conditions, in step 520 it is determined whether the license is otherwise valid. Step 520 may involve evaluating other conditions included within the license, verifying the integrity of the license or ensuring the authenticity of a signature of a trusted issuer. If the license is not otherwise valid, access is denied in step 518. When the license is otherwise valid, in step 522 the principal is allowed to utilize the resource. Finally, updated state information may be transmitted to the state server in step 524.

Figure 6:
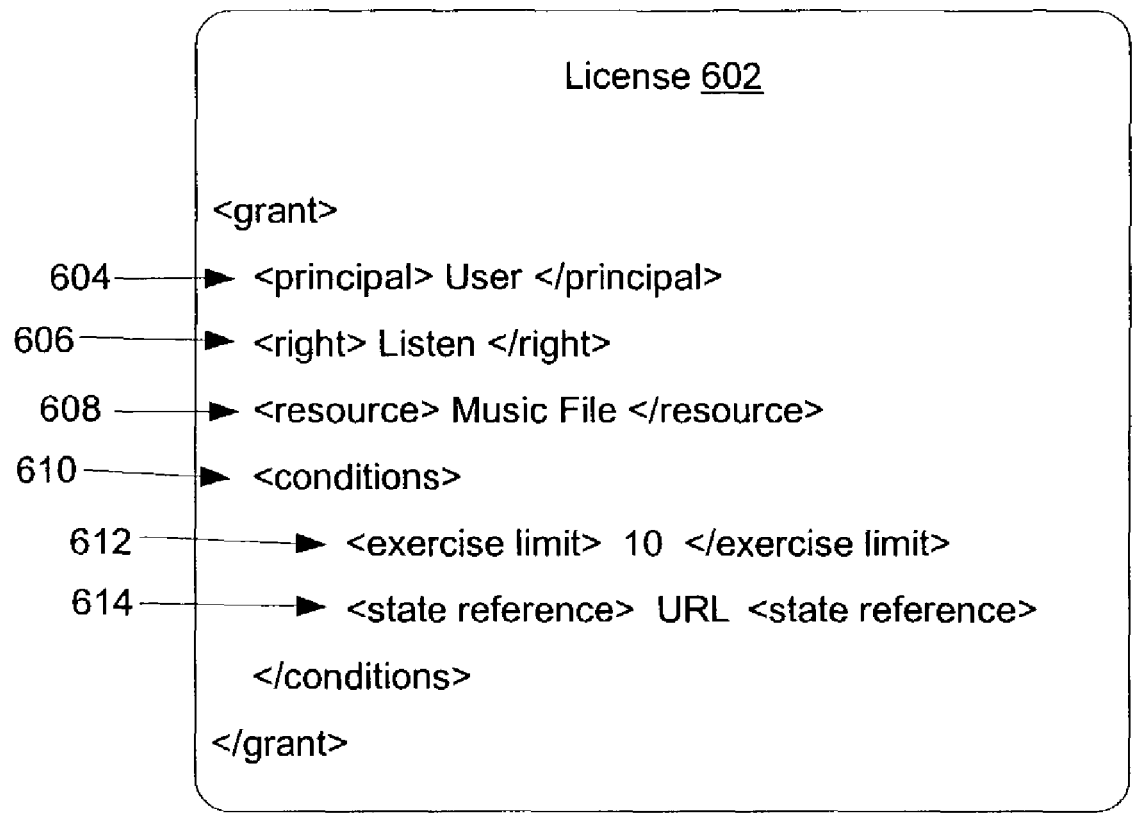
FIG. 6 illustrates a license data structure formatted in accordance with an embodiment of the invention.

FIG. 6 illustrates a license data structure in accordance with one embodiment of the invention. A license 602 may be formatted in accordance with a markup language such as XML or XrML. Field 604 identifies a principal. One or more rights are identified in field 606. The right may include the right to download, listen to, or otherwise utilize a digital file, the right to use or access a service or some other right. The resource is identified in field 608. A condition field 610 may include one or more conditions that limit how the license may be utilized. Conditions field 610 may also include limits regarding the transfer of state information. For example, a condition may prevent state information from being transferred to a device that is not coupled to a state server or other entity storing state information, or may otherwise restrict its use. Field 612 includes an exercise limit to limit the number of times license 602 may be utilized. Of course numerous other expressions may be used instead of an exercise limit, such as a total time period that the resource may be utilized. Next, a state reference field 614 may be included to identify where the current state information is stored.

Further, embodiments of the invention may be implemented in hardware, software, or by an application specific integrated circuit (ASIC). The firmware may be in a read-only memory and the software may reside on a medium including, but not limited to, read-only memory, random access memory, floppy disk or compact disk.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A computer-implemented method of processing an electronically signed license, the processing being performed by an access control module in communication with an external state server via a wide area network, wherein the external state server is configured to update and store state information associated with the signed license, the signed license being issued by a trusted issuer includes at least a principal name, right, resource, state reference, and resource fields for granting at least one principal a right to a resource, the at least one principal being a separate entity from the state server and being prohibited access to the state information, the method comprising:

(a) receiving the signed license from the trusted issuer, the state reference field of the signed license containing an identifier that identifies the state server in order to provide indirect access to the state information stored in the external state server, the resource field of the signed license containing a reference to the resource that is stored separately from the signed license, the state information is information that is changed each time the principal accesses the resource without changing information contained in the signed license;

(b) receiving, from said state server via said identifier contained in the state reference field of the signed license, the state information, and wherein the access control module sends a request to the state server to retrieve the state information using the identifier contained in the state reference field via said wide area network, wherein the requested state information is updated state information;

(c) determining whether a license condition is satisfied based on the received state information; and (d) allowing the principal to exercise the right when the license condition is satisfied.

2. The computer-implemented method of claim 1, wherein the state information comprises a number of times the resource has been utilized by at least one principal.

3. The computer-implemented method of claim 1, wherein the state information comprises a total time period that the resource has been utilized by at least one principal.

4. The computer-implemented method of claim 1, wherein the reference to state information includes an associated Boolean expression.

5. The computer-implemented method of claim 1, wherein the reference to state information comprises a uniform resource name.

6. The computer-implemented method of claim 1, wherein the license is created with a usage rights language that is a derivation of XML.

7. The computer-implemented method of claim 1, wherein the license is created with an object-oriented programming language.

8. The computer-implemented method of claim 1, wherein the right includes a right to download a digital file.

9. The computer-implemented method of claim 1, wherein the right includes a right associated with a service.

10. The computer-implemented method of claim 1, further including; transmitting updated state information to the state server.

11. The computer-implemented method of claim 1, wherein (c) comprises comparing the state information to the license condition.

12. A computer-implemented method in a security system that includes a trusted issuer, at least one principal, an access control module, and a state server, the at least one principal being a separate entity from the state server, the access control module being connected to the state server via a wide area network, the state server being configured to update and store state information external to an electronically signed license generated by the trusted issuer, the method granting at least one right to at least one resource, the method comprising:

the trusted issuer generating the electronically signed license that includes at least principal, right, resource, and state reference fields for granting the at least one principal a right to a resource that is separate from the license; wherein the state reference field included in the signed license contains at least one reference that identifies said state server in order to provide indirect access to the stored state information, and wherein the state information is information that is changed each time the principal accesses the resource without changing information contained in the generated license, and wherein the access control module sends a request to the state server to retrieve the state information using the identifier contained in the state reference field via said wide area network, wherein the requested state information is updated state information;

transmitting initial said state information to the state server;

and modifying the external stored state information in said state server.

13. The computer-implemented method of claim 12, wherein the license is created with an object-oriented programming language.

14. The computer-implemented method of claim 12, wherein the license is created with a usage rights language that is a derivation of XML.

15. A computer-readable medium containing computer-executable instructions for causing a computer device to process an electronically signed license, the processing being performed by an access control module of a computer device in communication with an external state server via a wide area network, wherein the external state server is configured to update and store state information associated with the signed license, the signed license includes at least principal, right, resource, state reference, and resource fields for granting at least a principal a right to a resource, the principal being a separate entity from the sate server and being prohibited access to the state information, the computer-executable instructions causing the computer device to perform the steps comprising:

(a) receiving the signed license from the trusted issuer, the state reference field of the signed license containing an identifier that identifies the state server in order to provide indirect access to the state information stored in the external state server, the resource field of the signed license containing a reference to the resource that is stored separately from the signed license, the state information is information that is changed each time the principal accesses the resource without changing information contained in the signed license;

(b) receiving, from said state server via said identifier contained in the state reference field of the signed license, the state information, and wherein the access control module sends a request to the state server to retrieve the state information using the identifier contained in the state reference field via said wide area network, wherein the requested state information is updated state information;

(c) determining whether a license condition is satisfied based on the received state information; and (d) allowing the principal to exercise the right when the license condition is satisfied.

* * * * *